Sept. 21, 1965  A. O. SANDBORG  3,207,902
RADIATION POSITION DETECTOR
Filed June 20, 1963
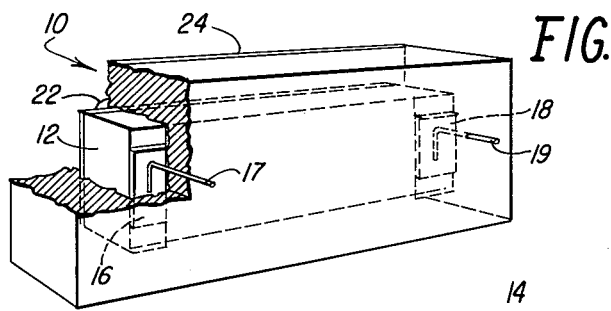
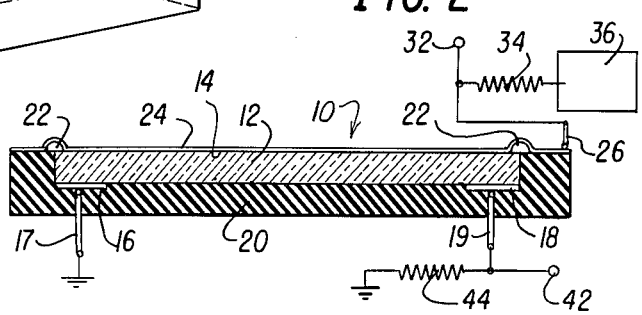
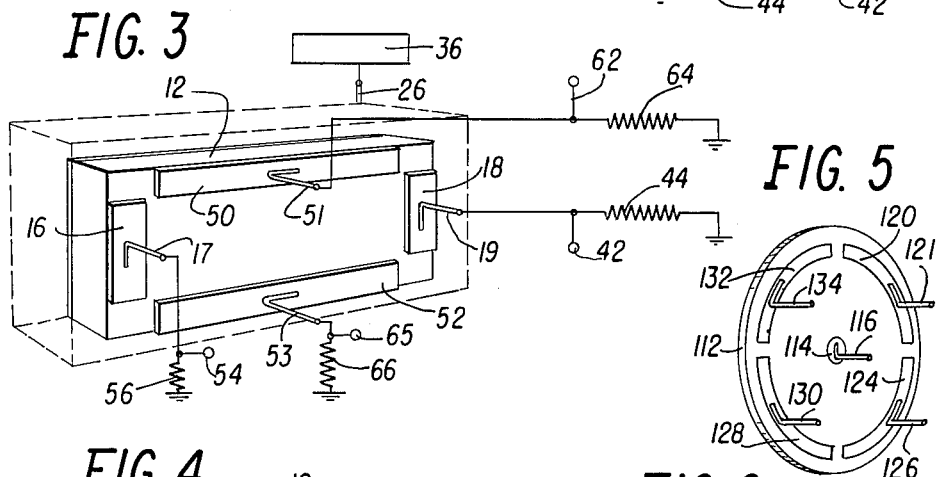
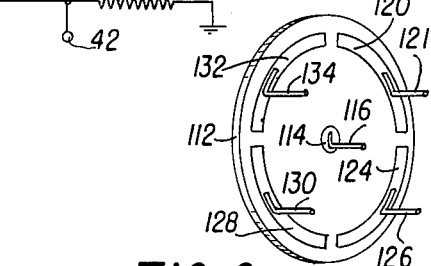
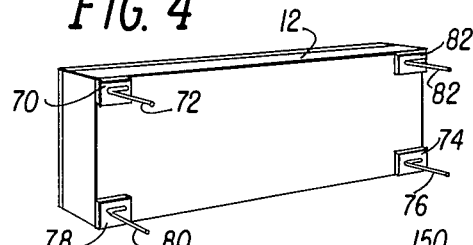
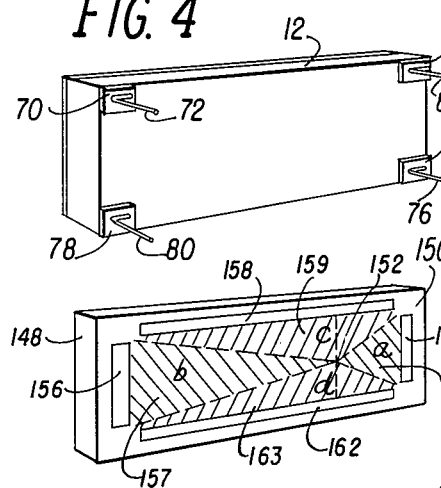
INVENTOR.
Alan O. Sandborg
BY
Byron, Hume, Groen & Clement
Attys.

United States Patent Office 3,207,902
Patented Sept. 21, 1965

3,207,902
RADIATION POSITION DETECTOR
Alan O. Sandborg, Deerfield, Ill., assignor to Nuclear Diodes, Inc., Highland Park, Ill., a corporation of Illinois
Filed June 20, 1963, Ser. No. 289,292
6 Claims. (Cl. 250—83.3)

The present invention relates to radiation detectors and analyzers, and particularly to p-n junction detectors for use therein.

Each radiation particle has its own energy-occurrence rate pattern whereby identification of particle emission from a radiation source is based upon detection and recording of the energy-occurrence rate characteristic. Where a plurality of particles are radiated from a source simultaneously, the recorded energy-occurrence curve displays this complication, whereby it is often necessary to review in greater detail or "spread" the energy curve in order to more accurately identify the particles being emitted. One manner in which this can be done is to pass the radiated particles through a collimator, and through a magnetic or electro-static field before striking the detector. The high energy particles will be least influenced by the field and thereby least deflected in its path of traverse from the collimator to the detector whereas the low energy particles will suffer a high deflection from their initial path of traverse from the collimator to the detector. By detecting the various deflected particles and counting them, it is possible to make a very highly accurate and defined particle analysis.

Heretofore, this approach has required the use of a plurality of particle detectors positioned closely spaced apart in the particle deflection path. The requirement for a plurality of particles detectors is complicating enough but in addition there is the requirement that each detector have associated therewith amplifier equipment, gating equipment and pulse counter equipment. Accordingly the equipment requirement for such position detection usage is not only demanding from a financial point of view, but using such equipment is very time consuming because of the multiplicity of connections that have to be made, checks and tests that have to be performed before the analysis can be carried out properly.

It is a general object of the present invention to provide new and improved detector means of an inexpensive and simplified kind which will permit more easy detection and analysis of radiated particles in a particle deflection scheme.

A more specific object of the invention is to provide a new and improved detector arrangement capable of identifying the position at which a radiation particle strikes the detection surface.

A more specific object of the invention is to provide a new and improved surface barrier p-n junction particle detector which can be made to identify the position in which a particle strikes the detection surface and also identify the energy imparted by the impinging particle.

Further objects and features of the invention pertain to the particular arrangement and construction whereby the above identified and other objects of the invention are attained.

The invention, both as to its construction and mode of operation, will be better understood by reference to the following specification and drawings, forming a part thereof, wherein:

FIGURE 1 is a perspective view, partially broken away, of a surface barrier detector in accordance with the present invention;

FIGURE 2 is a cross sectional view with circuit connections of the arrangement shown in FIGURE 1;

FIGURE 3 is another embodiment of the surface barrier detector in accordance with the present invention showing circuit connections;

FIGURE 4 is still another embodiment of the surface barrier detector in accordance with the present invention;

FIGURE 5 is yet another embodiment of the surface barrier detector in accordance with the present invention;

FIGURE 6 is a schematic representation of an equivalent circuit for the arrangement of FIGURE 2; and FIGURE 7 is a perspective view of an arrangement shown in FIGURE 3 displaying an area resistance concept.

Turning now to the drawings, and referring specifically to FIGURES 1 and 2, there is shown therein a p-n junction detector of the surface barrier type particularly adapted for use with radiation analyzer and counter equipment. The surface detector 10 thereof is comprised basically of a slice 12 of $n$ type silicon of high purity for which the front surface 14 thereof is etched so as to provide the p-n junction characteristic. To the back or opposite surface of the crystal 12, and at opposite ends thereof, is positioned two electrodes 16 and 18 which are formed in this instance by nickel metal plated to the back side of the crystal. A conductor 17 is soldered to the electrode 16 and a conductor 19 is soldered to the electrode 18.

The crystal so prepared is then potted on all surfaces except the surface 14 thereof in a layer 20 of appropriate potting material such as epoxy resin. At the front surface of the crystal 20 the complete perimeter of the junction between the crystal 12 and the epoxy layer 20 is overlapped with a bead 22 of iodine doped epoxy resin all in accordance with semi-conductor practice. Then the entire surface 14 of the crystal 12 and the corresponding surface 23 of the epoxy layer 20 has a gold conductive layer evaporated thereon to provide a further electrode 24 for the surface barrier detector. To this electrode 24 an electrode 26 is contacted either by soldering or by pressure contact through a support frame, not shown.

Giving consideration for a moment to dimensions such as are utilized relative to the crystal in actual practice, the thickness of the crystal should be in the order of 10 mils, with thinner thicknesses being selected for more highly critical circumstances. This thickness along with the inherent resistive characteristics of the silicon crystal selected determines the amount of bias that an be applied across the crystal, it being contemplated that where the crystal is selected to have a resistivity of 3,000 ohms per centimeter, the detector can withstand a reverse bias upwards in the order of 100 volts. The important consideration for the present application is that the thickness of the crystal, the resistivity of the crystal and the bias thereon be selected so that there is a particle depletion depth within the thickness of the crystal. The other lateral dimensions of the crystal may be varied in accordance with the use to which the crystal is to be employed. However, in one exemplary use of the crystal it was selected to be 18 millimeters long and 6 millimeters wide with electrodes on the back side of the crystal of a selected width of 2 millimeters each.

The manner of use of the single dimension position detector, shown in FIGURES 1 and 2, is best illustrated by the schematic connections of FIGURE 2, wherein the conductive surface 24 is connected by means of a conductor 26 jointly to an output terminal 32 and to a load resistor 34 extending to a soure of negative bias 36.

In addition, one of the nickel electrode areas, here selected to be the electrode 16 is connected to ground potential through the conductor 17. The other electrode 18 is connected via the conductor 19 jointly to an output terminal 42 and through a load resistor 44 extending also to ground potential. In this arragnement, the output terminal 32 provides what is hereinafter referred to as "signal A" and the output terminal 42 provides an output signal hereinafter referred to as "signal B." When a particle impinges upon the detector surface 24 and is depleted within the depth of the crystal 12, a total charge corresponding to the energy of the particle is built up between the conductive layer 24 and the pair of electrodes 16 and 18 between ground potential and the negative bias source 36. Accordingly, a positive going voltage signal is developed due to the charge appearing across the capacitance of the detector, appearing at the output electrode 32 as the "signal A." At the same time the charge built up in the crystal 12 causes a negative going voltage signal to appear at the negative going voltage electrode 16 and another signal to appear at electrode 18. The sum of these two signals in the same as the signal appearing at electrode 32, with the exception of a reversal of polarity of the signals. However, the significant consideration with regard to the electrodes 16 and 18 is that the proportion of charge appearing at these electrodes is related directly and linearly to the relative position of impact of the particle on the crystal 12 between the electrodes 16 and 18.

Thus, by detecting the magnitude of the signal at the output electrode 42 as compared to the total signal appearing at the output electrode 32, it is possible to make an accurate determination of the point at which the particle impacted between the two electrodes 16 and 18. Of course, in the arrangement shown in FIGURE 2, the signal appearing at the electrode 42 is a negative going pulse. Accordingly, when the output electrode 32 is connected to a preamplifier for receiving the "signal A" and when the output terminal 42 is connected to a preamplifier for receiving "signal B" there is produced from the output electrode 32 a pulse whose height in volts is proportional to 100% of the energy of the intercepted particle and there is produced from the preamplifier associated with the output terminal 42 a signal whose height in volts is a certain percentage of the output signal derived from the terminal 32 as determined by the relative point of intercept or impact between the two electrodes 16 and 18. Thus, for example, if the particle impacted directly over the electrode 16, a signal of a given amplitude corresponding to the energy of the particle would be derived from the output terminal 32 but no signal would be derived from the output terminal 42 thereby indicating to the observer that the position of impact was in the area of the electrode 16. By way of further example, if a particle of the same energy were to impact at midpoint between the two electrodes 16 and 18, the output signal from the output terminal 42 would be one-half the magnitude of that derived from the output terminal 32. By way of further example, if that same particle impacted immediately over the electrode 18, the output signal from the terminal 42 would be of substantially the same magnitude as that from the output terminal 32. In this manner there is derived not only a signal corresponding to the total energy of the radiation particle impinging upon the surface barrier detector but another proportional signal indicating the point of impact as between two spaced apart detecting electrodes on the back surface of the crystal 12.

Another alternative approach for use of the detector 10 in connecting it in an electronic circuit would be, for example, to connect the output electrode 26 from the conductive layer 24 directly to the bias source 36 whereby no signal would be detected from the conductor 24. But at the same time, the connection of the conductor 17 extending from the electrode 16 would be arranged substantially in accordance with the connection made with regard to conductor 19 in extension from the electrode 18. That is, the conductor 17 would be connected to ground potential through a load resistor and also to an output terminal. In this circumstance the sum of the two output signals derived from the electrodes 16 and 18 would correspond to the energy of the impinging particle and the relative magnitude of the two signals derived from the electrode 16 and 18 would indicate the propor-tional distance of impact between the two electrodes, with the larger output signal indicating that the point of impact as between the two electrodes was nearest the electrode from whence the larger amplitude signal was derived.

These two examples are meant to be merely illustrative of the two of the many ways in which the surface barrier detector in accordance with the present invention can be utilized by those skilled in the art and is not meant in any way to limit the application of the use of this position detector.

A further variation of the application of the principles of the present invention is illustrated in FIGURE 3 wherein the crystal 12, otherwise potted and arranged in accordance with that described above relative to FIGURES 1 and 2, is modified to include on the back surface thereof not only the nickel plated electrodes 16 and 18 disposed at two opposite edges of the back of the crystal but includes in addition two other oppositely disposed electrodes 50 and 52, at the other opposite edges of the back of the surface. Just as the electrodes 16 and 18 are of nickel plated on to the back of the crystal so also are the electrodes 50 and 52 of nickel plated on to the back of the surface. Similarly, as there are electrical conductors 17 and 19 in extension from the electrodes 16 and 18, respectively, there is in extension from the electrode 50 a conductor 51 and there is in extension from the electrode 52 a conductor 53.

The manner of use for the arrangement shown in FIGURE 3 in connecting it into electronic circuitry is substantially the same as that described relative to FIGURE 2, except that in this instance the electrodes 50 and 52 provide a means for measuring the position of particle impact in the direction that is perpendicular to the position measured by the electrodes 16 and 18. Thus, assuming that the conductor 26 associated with the conductive layer 24 on the face of the detector is connected directly to the bias source 36 as previously suggested, the electrode 18 and its associated conductor 19 is connected otherwise shown in FIGURE 2, the electrode 16 and the conductor 17 is connected to ground through a load resistor 56 and to an output terminal 54, the electrode 50 through its conductor 51 is connected to ground potential through a load resistor 64 and also to an output terminal 62, and the electrode 52 and its output conductor 53 is connected to ground potential through a load resistor 66 and also to an output terminal 65. In this arrangement a total energy detection can be made and also a determination as to the position of impact within the area enclosed by the electrodes 16, 18, 50 and 52. Specifically, the sum of the voltages derived from the output terminals 42, 54, 62 and 65 will correspond to the total energy of the impinging particle, but the relative amplitude of the signals derived from the pairs of electrodes 16 and 18 and 50 and 52 will determine the position within the enclosed area that the point of impact took place. Thus, if the signal at the output terminal 42 is twice as great as that measured from the output terminal 54, it will be indicated that the particle impacted at a position one-third of the distance between the two electrodes 16 and 18 as measured from the electrode 18. Similarly, an output signal from the terminal 62 that is twice as great as the output signal from the terminal 65 will indicate that the point of impact was one-third of the distance between the two electrodes 50 and 52 as measured from the electrode 50. This is illustrative merely of one manner in which a detector arrangement of the configuration shown in FIGURE 3 could be utilized in an electronic circuit.

A further variation of the arrangement shown in FIGURE 3 is illustrated in FIGURE 4. Therein the silicon crystal 12 includes electrodes on the back side thereof arranged differently than that suggested above. Specifically, in this case the electrodes are positioned at the corner of the back surface with the electrode 70 being provided with at the output conductor 72, the electrode 74 at the opposite diagonal corner of the crystal being provided with the output conductor 76, the electrode 78 at another corner being provided with a conductor 80 and the electrode 82 disposed at the corner diagonal from the electrode 78 being provided with an output conductor 84. The manner in which these electrodes would be paired for electronic connection and pulse analyzation would be entirely at the option of the techician.

A further adaptation of the principles of the present invention is illustrated in FIGURE 5 wherein there is shown a circular silicon crystal 112 of substantially the same characteristics as the crystal 12 described above but carrying on the back face thereof a center electrode 114 having an extension therefrom a conductor 116, and arcuately spaced quadrant electrodes 120, 124, 128 and 132 positioned near the outer periphery of the back surface of the disc. These quadrant electrodes are provided with the output conductors 122, 126, 130, and 134, respectively. In this form of arrangement, detection can be made as to position of impact by detecting the quadrant electrodes from which signals are derived and measuring amplitude of the signal at those electrodes relative to that at said center electrode 114. Again, an electronic technician skilled in the art can make appropriate electrical connections to provide such detection.

The arrangement of FIGURE 5 can be further modified to form the annular segments into a continuous ring electrode and the disc can be made to include a central aperture through the center electrode whereby range could be detected without azimuth. The disc might include a plurality of spaced ring electrodes for more accurately determining range measurements.

The manner of operation of the crystal in accordance with the present invention in providing position detection is not completely understood, but its effect, by analogy, appears to be as illustrated in FIGURE 6. Specifically, the p-n junction semi-conductor crystal acts to its depletion depth as a capacitor made up of a continuous plate 140 and a disc continuous plate 142. The remainder of the crystal in its thickness beyond the depletion depth corresponds to a linear resistor 146 in extension between the end electrodes 161 and 181. The individual parts 142a, 142b, etc. of the plate 142 are connected to segments of the resistor 146 as illustrated. Accordingly, as a particle impacts at a given position on the face of the disc, an electron flow path is established between the plate 140 and the segment 142d, for example.

As a result, a current flow is experienced through the resistor 146 wherein a voltage pulse appears at the electrode 181 which is smaller than the voltage pulse on the electrode 161 in the same proportion that the segment 142a to 142d is smaller than the segment 142d to 142g.

This is one possible interpretation of the physical action that takes in a crystal in a one dimensional analysis. For a two dimensional analogy reference is made to FIGURE 7. Therein the back face 150 of the crystal 148 is considered as an area resistance of linear characteristic. A particle impacting on the front face at the point 152 will cause an election flow to the electrode 154 over the area 155, to the electrode 156 over the area 157, to the electrode 158 over the area 159 and to the electrode 162 over the area 163.

The relationship of the voltage in the electrode 154 to that on electrode 156 will be inversely proportional to the area of the triangle 155 to the area of the triangle 157, or inversely proportional to the altitude $a$ of triangle 155 to the altitude $b$ of triangle 157. By the same token, the relationship of the voltage on the electrode 158 to the voltage on the electrode 162 is inversely proportional to the altitude $c$ of the triangle 159 to the altitude $d$ of the triangle 163.

In each instance, no matter what the configuration of the crystal, rectangular, round, triangular, etc. the current flow path from the impacting position of a particle to a pair of measuring electrodes is the shorest distance to the electrode and the relationship between the voltage pulses at the two electrodes is inversely proportional to their individual distances from impact position.

The arrangements described herein are presently considered to be preferred. However, it is appreciated that those skilled in the art may make variations therein without departing substantially from the spirit and scope hereof. Accordingly, it is intended to cover in the appended claims all such variations and modifications as fall within the true spirit and scope of the invention.

I claim:

1. A radiation detector for measuring the energy and position of radiation particles comprising, a thin slice of semi-conductor material including therein a p-n junction, a first electrode on one surface thereof, and a pair of spaced second electrodes at opposite edges of the opposite surface thereof, biasing means between said first and second electrodes wherein upon penetration of said junction by a radiation particle the charge collected at said first electrode corresponds to the sum of the charge collected at said second electrodes and wherein the proportion of charge collected at one of said pair of electrodes to the sum of charge collected at both said second electrodes is directly related to the position of impingement of said radiation particles between said second electrodes.

2. A radiation detector for measuring the energy and position of radiation particles comprising, a thin slice of semi-conductor material having a p-n junction developed on one surface thereof, a first coating of conductive material on said one surface providing a first electrode, a second coating of conductive material on the opposite surface of said slice providing a pair of second electrodes spaced at opposite edges of said opposite surface, biasing means between said first and second electrodes, wherein upon penetration of said junction surface by a radiation particle the charge collected at said first electrode corresponds to the energy of said particle and wherein the proportion of the charge collected at one second electrode to the sum of the charge collected at both second electrodes is inversely proportional to the distance between said second electrodes as measured from said one second electrode.

3. A radiation detector for measuring the energy and position of radiation particles comprising, a thin rectangular slice of semi-conductor material having a p-n junction developed on one surface thereof, a first electrode on one surface thereof, and a second coating of conductive material on the opposite surface of said slice providing a first pair of second electrodes spaced along first opposite edges of said opposite surface and a second pair of second electrodes perpendicularly oriented to said first pair and spaced along second opposite edges of said opposite surface, and biasing means between said first and second electrodes, wherein upon penetration of said junction surface by a radiation particle the charge collected at said first electrode corresponds to the energy of said particle, and wherein the proportion of charge collected at one electrode of one of said first and second pairs of second electrodes to the sum of the charge collected in both electrodes of that pair is inversely proportional to the distance between the electrodes of that pair as measured from said one electrode.

4. A radiation detector for measuring the energy and position of radiation particles comprising, a thin rectangular slice of semi-conductor material having a p-n juncton developed on one surface thereof, a first electrode on one surface thereof, and a second coating of conductive material on the opposite surface of said slice providing four individual second electrodes positioned in the corners of said surface, biasing means between said first and second electrodes, wherein upon penetration of said junction surface by a radiation particle the charge collected at said first electrode corresponds to the energy of said particle, wherein the proportion of charge collected at any one of said second electrodes to the sum of the charge collected in said one second electrode and the diagonally opposite second electrode is inversely proportional to the distance between said one second electrode and its diagonally opposite second electrode as measured from said one second electrode.

5. A radiation detector for measuring the energy and position of radiation particles comprising, a thin circular slice of semi-conductor material having a p-n junction developed on one surface thereof, a first electrode on one surface thereof, and a second coating of conductive material on the opposite surface of said slice providing a second center electrode and four arcuate second peripheral electrodes, biasing means between said first and second electrodes, wherein upon penetration of said junction surface by a radiation particle the charge collected at said first electrode corresponds to the energy of said particle wherein the proportion of the charge collected at any one of said second peripheral electrodes to the sum of the current flow to said one second peripheral electrode and a next adjacent one of said second electrodes is inversely proportional to the arcuate distance of radiation penetration between the center of said second electrodes as measured from said one second peripheral electrode, and wherein the proportion of the current flow in center second electrode to the sum of the current flow to said second electrodes is inversely proportional to the distance of radiation penetration between said center second electrode and said peripheral second electrodes.

6. A detector for measuring the energy and position of an impinging radiation particle comprising: a thin semiconductive crystal having first and second overlying major surface areas, said first surface area being adapted to first receive said impinging particle, said crystal having a single continuous and radiation particle responsive p-n junction therein co-extensive with said surface areas; a first electrode of a conductive material covering said first surface area; and at least a pair of small second electrodes spaced apart on said second surface area and overlying a small area of said second surface area; and separate terminal means secured to each of said second electrodes allowing for measuring of the difference in potentials therebetween; said detector being adapted to provide a signal between said second electrodes accurately proportional to the position of the impingement of said particle in said crystal between said second electrodes.

References Cited by the Examiner

UNITED STATES PATENTS

| | | | |
|---|---|---|---|
| 2,959,681 | 11/60 | Noyce | 250—211 |
| 3,043,955 | 7/62 | Friedland et al. | 250—83.3 |

RALPH G. NILSON, *Primary Examiner.*

ARCHIE R. BORCHELT, *Examiner.*